United States Patent [19]

Asai et al.

[11] Patent Number: 4,905,139

[45] Date of Patent: Feb. 27, 1990

[54] CACHE MEMORY SYSTEM WITH IMPROVED RE-WRITING ADDRESS DETERMINATION SCHEME INVOLVING HISTORY OF USE

[75] Inventors: Hidehiro Asai; Kenichi Echigoya, both of Tokyo, Japan

[73] Assignee: NEC Corporation, Tokyo, Japan

[21] Appl. No.: 153,891

[22] Filed: Feb. 9, 1988

[30] Foreign Application Priority Data

Feb. 9, 1987 [JP] Japan .................................. 62-29292

[51] Int. Cl.[4] ...................... G06F 13/00; G06F 12/12
[52] U.S. Cl. .................................. 364/200; 364/243.4; 364/246.12
[58] Field of Search ... 364/200 MS File, 900 MS File, 364/300

[56] References Cited

U.S. PATENT DOCUMENTS 4,442,488 4/1984 Hall ...................................... 364/200

Primary Examiner—Lawrence E. Anderson
Attorney, Agent, or Firm—Sughrue, Mion, Zinn, Macpeak & Seas

[57] ABSTRACT

A cache memory system having an improved area addressing scheme for rewriting is disclosed. The cache memory system comprises a cache memory having a plurality of memory areas, a first detection circuit for designating the least recently accessed area by a CPU, a second detection circuit for detecting that the least recently accessed memory area is not designated and a control circuit for forcibly selecting a predetermined one memory area for rewriting when the least recently accessed memory area is not designated.

4 Claims, 2 Drawing Sheets

CACHE MEMORY SYSTEM WITH IMPROVED RE-WRITING ADDRESS DETERMINATION SCHEME INVOLVING HISTORY OF USE

BACKGROUND OF THE INVENTION:

The present invention relates to a memory system, and more particularly to an address control circuit for designating a memory block to be subjected to data exchange with a main memory.

Computer system includes a main memory which is connected to a central processing unit (CPU) via a bus. While operation speed of the CPU has become very fast, the operation speeds of the bus and the main memory are still low. Therefore, it is difficult to transfer data between the CPU and the main memory at the high operation speed of the CPU. A high speed memory called a cache memory has been proposed to be inserted between the CPU and the main memory, so that the CPU may directly have interface with the cache memory at a high speed. The capacity of the cache memory is limited and small. Therefore, the cache memory stores a relatively small quantity of data which are read from the main memory. In order to implement the above function of the cache memory, the storage addresses of the cache memory are divided into a plurality of areas. Namely, memory cells of the cache memory are divided into a plurality of memory cell blocks. A control circuit is provided to the cache memory for designating the memory cell block or area to be accessed by the CPU according to the history of the access or utilization of the respective memory cell blocks or the areas. Namely, the order of the utilization of the respective cell blocks are stored in a control memory and the cell block which stores the oldest information, or, which is not utilized by the CPU most recently, is subjected to rewriting contents thereof in accordance with the contents of the main memory. The control memory includes a plurality of memory cells for storing the accessed order of the respective cell blocks, and the least recently utilized cell block (storing the oldest information) is designated by the control memory.

However, the conventional control memory fails to designate the cell block storing the oldest information in a certain case and the effective data exchange of information is not achieved between the cache memory and the main memory. For example, when a power supply to the control memory is switched on, the states of the respective memory cells in the control memory are made uncertain and the control memory cannot designate the cell block storing the oldest information.

SUMMARY OF THE INVENTION

It is an object of the present invention to provide a cache memory provided with an improved control memory for stably designating the cell block storing the oldest information in a cache memory.

The memory system according to the present invention comprises a cache memory coupled between a CPU and a main memory and having a plurality of memory locations classified into a plurality of memory areas, a control memory for storing used order of the memory areas in the cache memory, a detection circuit coupled to the control memory for detecting that the used order of the memory areas stored in the control memory is uncertain, and a set circuit for forcibly setting the control memory at a predetermined state when the detection circuit detects the uncertain state.

According to the present invention, the control memory can always designate the least recently used memory area in the cache memory. Therefore, information of the main memory is written to the designated memory area in the cache memory so that effective utilization of the cache memory is achieved.

DETAILED DESCRIPTION OF THE INVENTION

Figure 1:
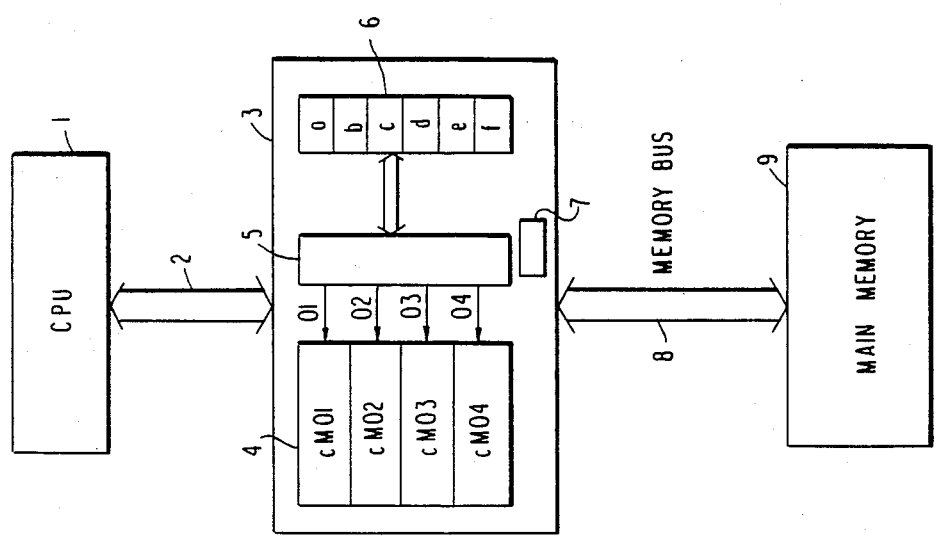
FIG. 1 is schematic block diagram showing a data processing system using a cache memory.

Referring to FIG. 1, a data processing system employing a cache memory is explained.

A CPU 1 is connected through a CPU bus 2 to a cache memory system 3. The cache memory system 3 includes a cache memory 4 having four memory areas CM01-CM04, a control memory 6 having memory bits a-f, a control circuit for designating one of the memory areas CM01-CM04 in accordance with the contents of the control memory 6, and a read/write control circuit 7 for designating address of a main memory 9 which is coupled to the cache memory system 3 via a memory bus 8 for transferring address of the memory 9 and data derived from the memory 9. The cache memory 4 operates at a speed higher than the main memory 9 but has a smaller memory capacity than the memory 9.

The CPU 1 requests necessary data to the cache memory system 3. In this instance, the read/write control circuit 7 judges whether the data requested by the CPU 1 is stored in the cache memory 4 or not. When the requested data is stored in one of the memory areas in the cache memory, the data stored in the above one memory area is transferred to the CPU via the bus 2 under control of the control circuit 7. When such data is not stored in the cache memory, data stored in the main memory is transferred to the CPU 1 via the bus 8 and written into one of the memory areas in the cache memory 4 under control of the control circuit 7. In this instance, among the four memory areas, the least recently used one which is to be used first is utilized for such writing of data from the main memory 9. This designation of the least recently used memory area is made by the control circuit 5 in accordance with the contents of the control memory 6.

An alogrithm for determining the least recently used memory area by the control memory 6 is explained with reference to FIGS. 2A-2C.

Figures 2A, 2B, 2C:
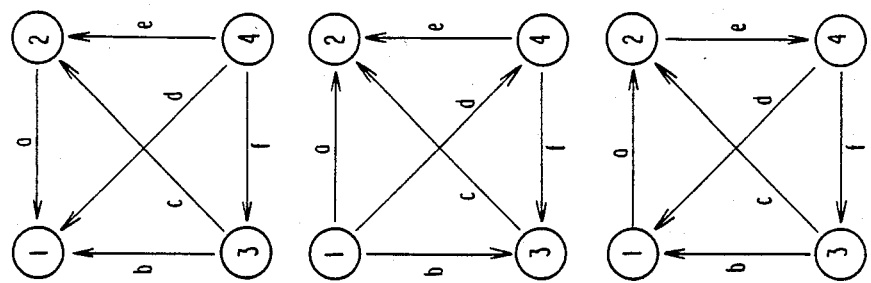
FIGS. 2A to 2C are diagrams showing alogorithm for determining the least recently used memory area in the cache memory.

In FIG. 2A, ①-④ correspond to the memory areas CM01-CM04 in the cache memory 4, respectively, and "a"-"f" correspond to the states of the memory bits a-f of the control memory 6, respectively.

The order of the oldness in utilization of the memory areas is designed by the number of arrows a-f. The direction of each arrow means the oldness, and the memory area to which a larger number of arrows are directed is more recently used one. For example, three arrows "a", "b" and "d" run towards the memory area (CM01) shown as ① and hence the memory area (CM01) is the least recently used, i.e. oldest area, in the cache memory. While, no arrow runs towards the memory area (CM04) denoted by ④ and therefore the memory area CM04 is the most newly used area by the CPU 1. The order of oldness in utilization in the cache memory 4 is the memory area CM01, area CM02, area CM03 and area CM04, in FIG. 2A.

If one of the areas is utilized by the CPU, this one area is the most recently used area and the three arrows run from this area towards other three areas. Therefore, if the area CM01 (①) in FIG. 2A is used by the CPU 1, then the state of the algorithm becomes one shown in FIG. 2B. Namely, the three arrows "a", "b" and "d" run from the area CM01 towards other three areas with other arrows "c", "e" and "f" unchanged. If it is defined that the state of each arrow is assumed "1" when that arrow runs from the area of the less designation number e.g. ① to the area of the larger designation number e.g. ② and "0" vice versa. Then the state of FIG. 2B is represented as (a, b, c, d, e, f) =(1, 1, 1, 0, 0, 0).

Figure 3:
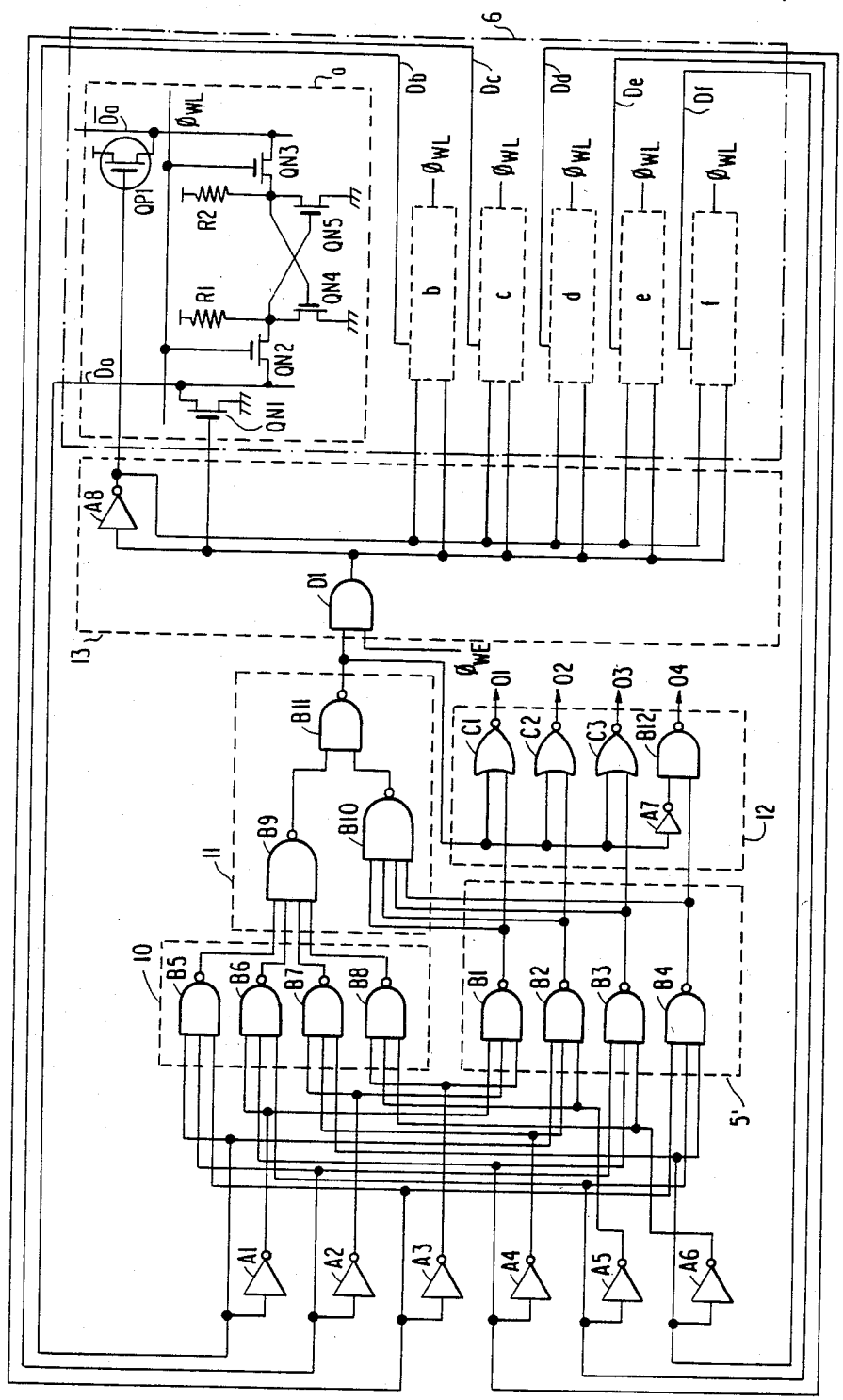
FIG. 3 is schematic block diagram of a control circuit for the cache memory according to one embodiment of the present invention.

Referring further to FIG. 3, the cache memory system includes the control memory 6 and the control circuit 5' which is composed of NAND gates B1-B4. The outputs of the six memory cells a-f of the control memory 6 are inputted to inverters A1-A6, respectively, to generate their complementary signals which are then applied to the circuit 5' together with their original outputs. The circuit 5' is basically a decoder for determining outputs 01 to 04 in accordance with the state of the memory cells a-f. When the states of the memory cells a-f are (a, b, c, d, e, f)=(0, 0, 0, 0, 0, 0), the output "01" is at "1" level with all the other outputs "02" to "03" being at "0" level. This shows that the memory area CM01 is the least recently used (oldest) area.

While, as shown in FIG. 2C, there is no memory area to which three arrows run. Rather, two arrows "b" and "d" run towards the memory area CM01 and two arrows "a" and "c" direct to the memory area CM02. In this case, the state of the control memory 6 is (a, b, c, d, e, f)=(1, 0, 0, 0, 1, 0) and all the outputs "01" to "04" become "0" level. Thus, these outputs fail to designate the least recently used memory area for rewriting content thereof.

Also, when a power supply to the control memory 6 is switched on, the states of the memory cells a-f are uncertain. Therefore, in this instance, there is possibility that the memory area to be subjected to rewriting for usage by the CPU 1 cannot be designated.

For avoiding the above-mentioned problems, the cache memory system of the invention further includes a circuit 10 (FIG. 3) of NAND gates B5 to B8 which determines the memory area most recently used by the CPU 1. When the circuit 5' cannot determine the least recently used memory area, the outputs of the NAND gates B1-B4 are all "1". When the circuit 10 cannot determine the most recently used memory area, the outputs of the NAND gates B5-B8 are all "1" level. A detection circuit 11 receives the outputs of the circuits 5' and 10 and detects that the outputs of the circuit 5' or 10 are all "1", that is, the least recently used memory area or the most recently used memory area cannot be determined. The circuit 11 includes a NAND gate B10 detecting all "1" outputs of the NAND gates B1 to B4, a NAND gate B9 detecting all "1" outputs of the NAND gates B5-B8, and a NAND gate B11. When the circuits 5' or 10 fails to designate the least recently used area or the most recently used area, the gate B11 produces "1" output. A circuit 12 produces the outputs "01" to "04" for designating one memory area for usage by the CPU 1. The circuit 12 includes NOR gates C1-C3, an inverter A7 and a NAND gate B12. When the output of the NAND gate B11 is at "0" level, the gates C1-C3 and B12 simply serve as inverters for inverting the outputs of the gates B1-B4. Therefore, one of the outputs "01" to "04" has the "1" level to designate the least recently used memory area. When the output of the gate B11 is in the "1" level, the output "04" is forcibly set at "1" level with the outputs "01" to "03" taking "0" level. A set circuit 13 includes an AND gate D1 receiving the output of the gate B11 and a write timing signal $\phi_{WE}$ and an inverter A8 for generating an inverted signal of D1. When the least recently used memory area or the most recently memory area is not detected and the output of the gate B11 is at the "1" level, the outputs of the gate D1 and the inverter A8 are at "1" and "0" levels, respectively, thereby to set all the memory cells at "0" logic state.

Referring to the memory cell "a" in FIG. 3, each of the memory cells "a" to "f" is composed of a flip-flop circuit having N-channel MOS transistors $Q_{N4}$ and $Q_{N5}$ and load resisters R1 and R2, a pair of transfer gate MOS transistors $Q_{N2}$ and $Q_{N3}$ with gates connected to an access-line $\phi_{WL}$, and a pair of the lines Da, $\overline{Da}$. An N-channel MOS transistor $Q_{N1}$ and a P-channel MOS transistor $Q_{P1}$ are also provided in each memory cell, which are rendered conductive thereby to set the memory cell at "0" state in response to "1" output of the gate D1. Needless to say, the other memory cells "b" to "f" are similarly structured to the cell "a" and set at "0" state in response to the "1" output of the gate D1.

When the state of the memory 6 is (a, b, c, d, e, f)=(1, 0, 0, 0, 1, 0), neither the least recently used memory area nor the most recently used memory area is designated as is the case of FIG. 2C. Namely, the outputs of the gates B1 to B8 are all "1" level so that the output of the gate B11 becomes "1" level. Therefore, among the outputs "01" to "04", only the output "04" is set at "1" state so that the memory area "CM04" is regarded as the least recently used memory area. Also, in this instance, all the memory cells "a"–"f" are forcibly set at "0" level. This states of the memory 6 of (a, b, c, d, e, f)=(0, 0, 0, 0, 0, 0) indicates that the memory area "CM04" is the least recently used area. Although not shown, the outputs "01" to "04" are sampled or latched when they are produced in a known manner, and the change in the state of the memory 6 does not affect utilization of the outputs "01" to "04".

As has been described, the present invention has great advantage in determining the area of the cache memory.

We claim:

1. A system comprising a central processing unit, a main memory, a cache memory having a plurality of memory blocks, a first bus connected between said central processing unit and said cache memory for transferring signals therebetween, a second bus connected between said cache memory and said main memory for transferring signals therebetween, said central processing unit accessing one of said memory blocks through said first bus, a control memory having a plurality of control storage cells, a relation of oldness in access to said memory blocks by said central processing unit being defined between each combination of two of said memory blocks, each of said control storage cells storing said relation between each combination of two of said memory blocks, a first detection circuit coupled to said control memory for designating a first one of said memory blocks in accordance with contents of said control storage cells, said first one of said memory blocks being the oldest memory block in history of accessed order of said memory blocks, a second detection circuit coupled to said control memory for designating a last one of said memory blocks in accordance with the contents of said control storage cells, said last one of said memory blocks being the newest memory block in the history of accessed order of said memory blocks, first means coupled to said first detection circuit for generating a first signal when said first detection circuit fails to designate said first one of said memory blocks, second means coupled to said second detection circuit for generating a second signal when said second detection circuit fails to designate said last one of said memory blocks, third means coupled to said first and second means for generating a control signal when both of said first and second signals are generated, a first control circuit coupled to said first and third means, said first control circuit addressing the last one of said memory blocks designated by said first detection circuit when said control signal is not present and addressing a predetermined one of said memory blocks when said control signal is present, fourth means coupled to said third means for setting said control storage cells in such a state that designates said predetermined one of memory blocks in response to said control signal, and a second control circuit coupled to said cache memory for writing data from said main memory to the memory block addressed by said first control circuit when data requested by said central processing unit is not stored in any of said memory blocks.

2. The system according to claim 1, in which said first detection circuit includes a plurality of NAND gates receiving outputs of said control storage cells in a predetermined combination, the number of said NAND gates being the same as that of said memory blocks.

3. The system according to claim 1, in which said second detection circuit includes a plurality of NAND gates receiving outputs of said control storage cells in a predetermined combination.

4. The system according to claim 1, in which each of said control storage cells includes a flip-flop circuit.

* * * * *